(12) United States Patent
Messerschmid

(10) Patent No.: US 9,944,038 B2
(45) Date of Patent: Apr. 17, 2018

(54) METHOD FOR PRODUCING A CUP

(71) Applicant: Uwe Messerschmid, Albershausen (DE)

(72) Inventor: Uwe Messerschmid, Albershausen (DE)

(73) Assignee: MICHAEL HOERAUF MASCHINENFABRIK GMBH UND CO. KG, Donzdorf (DE)

(*) Notice: Subject to any disclaimer, the term of this patent is extended or adjusted under 35 U.S.C. 154(b) by 294 days.

(21) Appl. No.: 14/732,024

(22) Filed: Jun. 5, 2015

(65) Prior Publication Data
US 2015/0352780 A1    Dec. 10, 2015

(30) Foreign Application Priority Data
Jun. 6, 2014    (DE) .................. 10 2014 210 960

(51) Int. Cl.
*B31B 50/28*    (2017.01)
*B31B 50/00*    (2017.01)
(Continued)

(52) U.S. Cl.
CPC ............ *B31B 50/00* (2017.08); *B29C 65/103* (2013.01); *B29C 66/135* (2013.01); *B29C 66/346* (2013.01); *B29C 66/4322* (2013.01); *B29C 66/49* (2013.01); *B29C 66/542* (2013.01); *B29C 66/612* (2013.01); *B29C 66/72328* (2013.01); *B29C 66/81425* (2013.01); *B29C 66/81431* (2013.01); *B29C 66/8322* (2013.01); *B29L 2031/7132* (2013.01);
(Continued)

(58) Field of Classification Search
CPC .................................. B31B 50/28; B31B 50/00
See application file for complete search history.

(56) References Cited

U.S. PATENT DOCUMENTS

| | | | |
|---|---|---|---|
| 1,876,931 A | | 9/1932 | Heywood et al. |
| 2,186,073 A | * | 1/1940 | Johnson ................ B31D 1/005 |
| | | | 118/215 |

(Continued)

FOREIGN PATENT DOCUMENTS

| | | |
|---|---|---|
| CN | 1525927 A | 9/2004 |
| EP | 0 108 264 A1 | 5/1984 |

(Continued)

OTHER PUBLICATIONS

European Patent Office Search Report issued in Application No. EP 15 16 8690 with English translation of category of cited documents dated Oct. 26, 2015 (9 pages).

(Continued)

*Primary Examiner* — Jeffry H Aftergut
(74) *Attorney, Agent, or Firm* — Flynn, Thiel, Boutell & Tanis, P.C.

(57) ABSTRACT

A method for producing a cup from a flat segment and a pot-like base, including the steps of winding the flat segment onto a winding mandrel, so that there is an overlap in the region of the side edges of the segment, connecting the sections, which adjoin the side edges, in the region of the overlap, so that a conical sleeve is produced, inserting the pot-like base into the conical sleeve, and connecting a circumferential wall of the pot-like base in a substantially liquid-tight manner to an inner face of the sleeve.

11 Claims, 14 Drawing Sheets

(51) Int. Cl.
    *B29L 31/00* (2006.01)
    *B29C 65/10* (2006.01)
    *B29C 65/00* (2006.01)
    *B31B 50/44* (2017.01)
    *B31B 50/81* (2017.01)
    *B31B 105/00* (2017.01)
    *B31B 110/10* (2017.01)
    *B31B 120/00* (2017.01)

(52) U.S. Cl.
    CPC ......... *B31B 50/003* (2017.08); *B31B 50/0012* (2017.08); *B31B 50/28* (2017.08); *B31B 50/44* (2017.08); *B31B 50/81* (2017.08); *B31B 2105/00* (2017.08); *B31B 2105/0022* (2017.08); *B31B 2110/10* (2017.08); *B31B 2120/002* (2017.08)

(56) References Cited

U.S. PATENT DOCUMENTS

| | | | |
|---|---|---|---|
| 2,216,331 A * | 10/1940 | Swallow | B31B 1/00 493/106 |
| 3,063,347 A | 11/1962 | Cummings | |
| 3,343,465 A * | 9/1967 | Albert | B29C 69/00 198/598 |
| 3,767,507 A | 10/1973 | Stahlecker et al. | |
| 4,072,226 A | 2/1978 | Richards et al. | |
| 4,100,842 A * | 7/1978 | Richards | B31D 1/005 271/117 |
| 4,204,462 A | 5/1980 | Richards et al. | |
| 4,295,838 A | 10/1981 | Richards et al. | |
| 4,317,323 A | 3/1982 | Richards et al. | |
| 4,318,703 A | 3/1982 | Richards et al. | |
| 4,366,016 A * | 12/1982 | Golden, Jr. | B29C 53/44 156/218 |
| 4,374,697 A * | 2/1983 | Tsuzuki | B29C 65/08 156/580.2 |
| 4,534,927 A * | 8/1985 | Morioka | B29C 53/06 264/285 |
| 8,727,206 B2 | 5/2014 | Messerschmid et al. | |
| 2009/0184020 A1 | 7/2009 | Messerschmid et al. | |
| 2011/0281704 A1 | 11/2011 | Messerschmid et al. | |
| 2014/0216972 A1 | 8/2014 | Messerschmid et al. | |

FOREIGN PATENT DOCUMENTS

| | | |
|---|---|---|
| EP | 2 080 715 A1 | 7/2009 |
| FR | 2 006 077 A1 | 12/1969 |
| FR | 2 330 533 | 6/1977 |

OTHER PUBLICATIONS

First Office Action issued by the Chinese Patent Office in Appln. No. 201510302290 dated Nov. 24, 2017 with English translation (19 pages).

\* cited by examiner

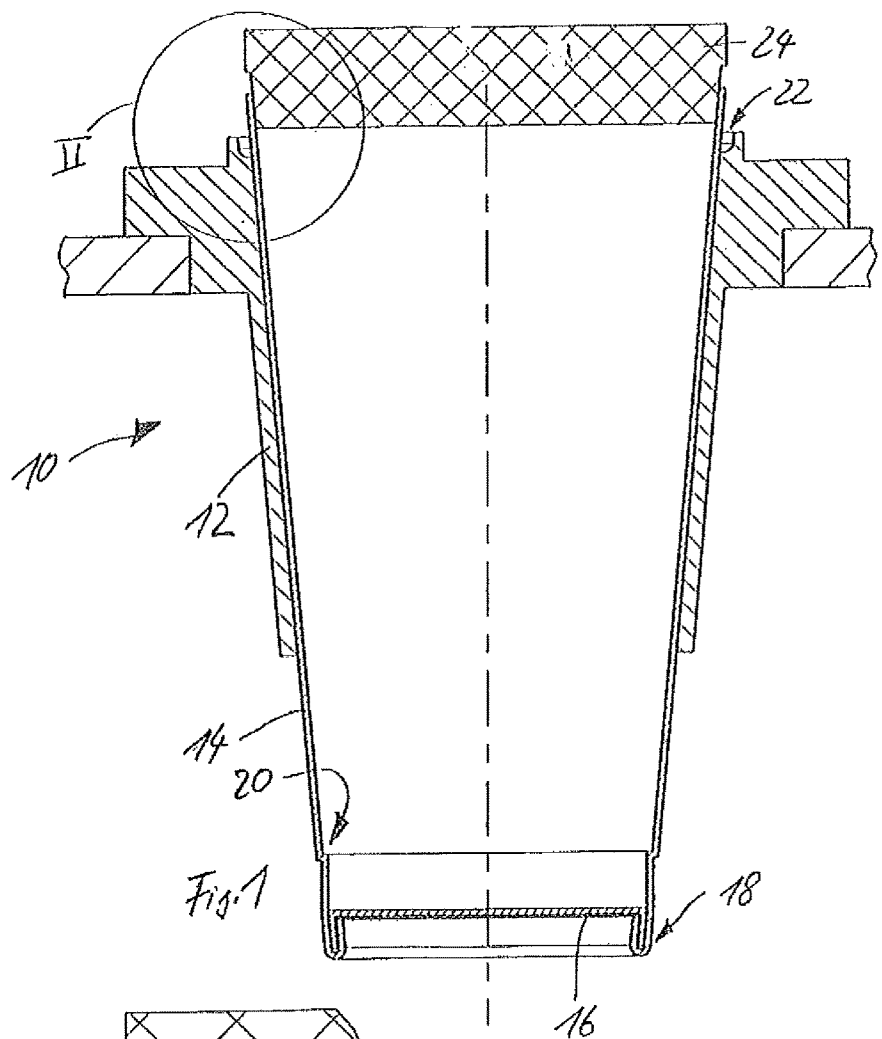
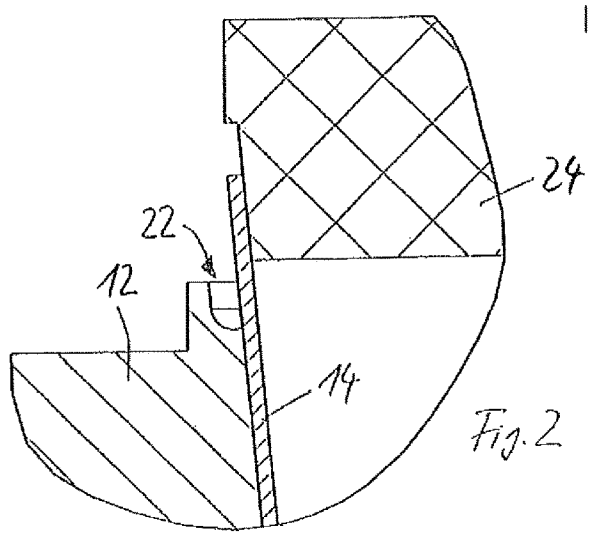

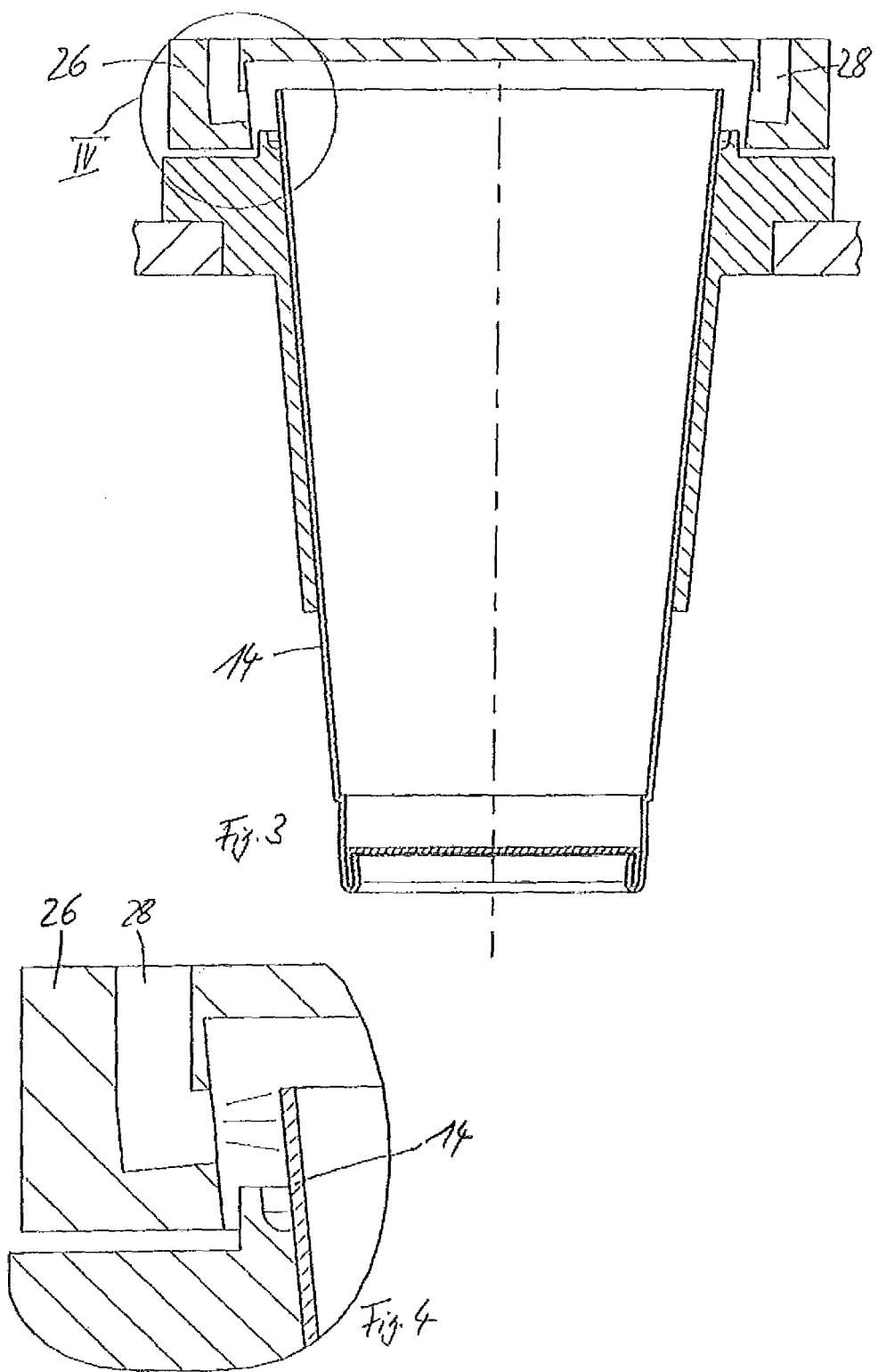

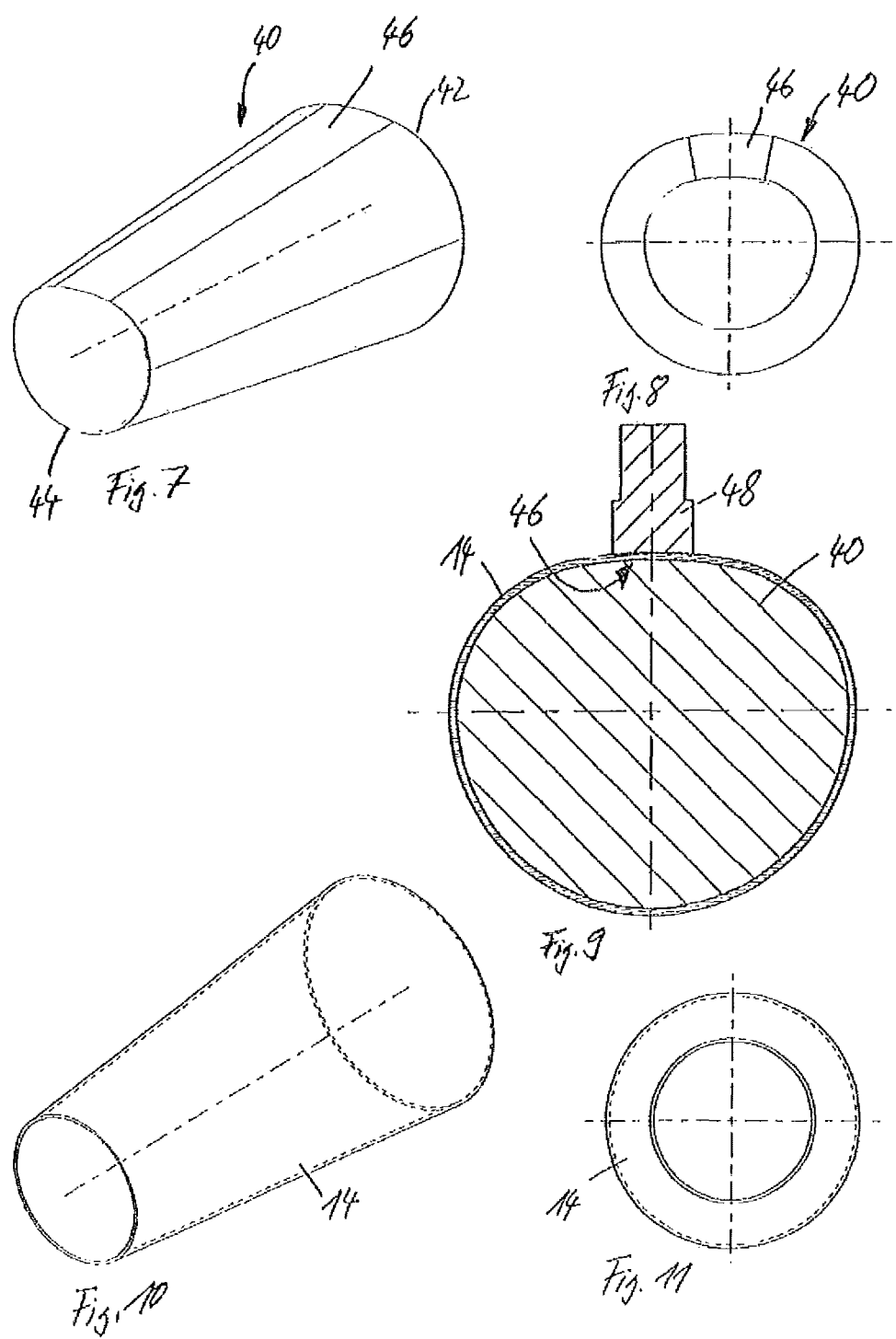

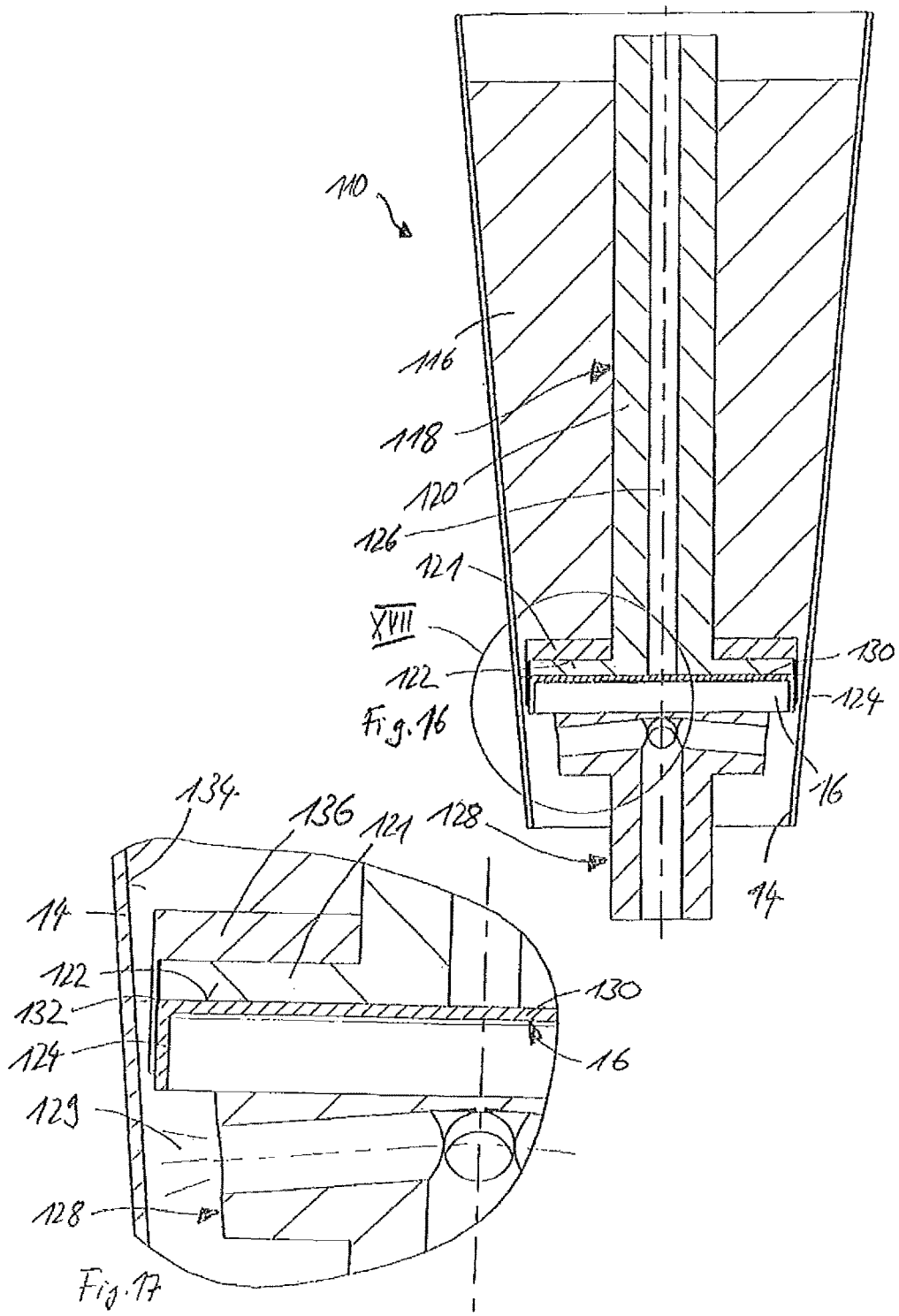

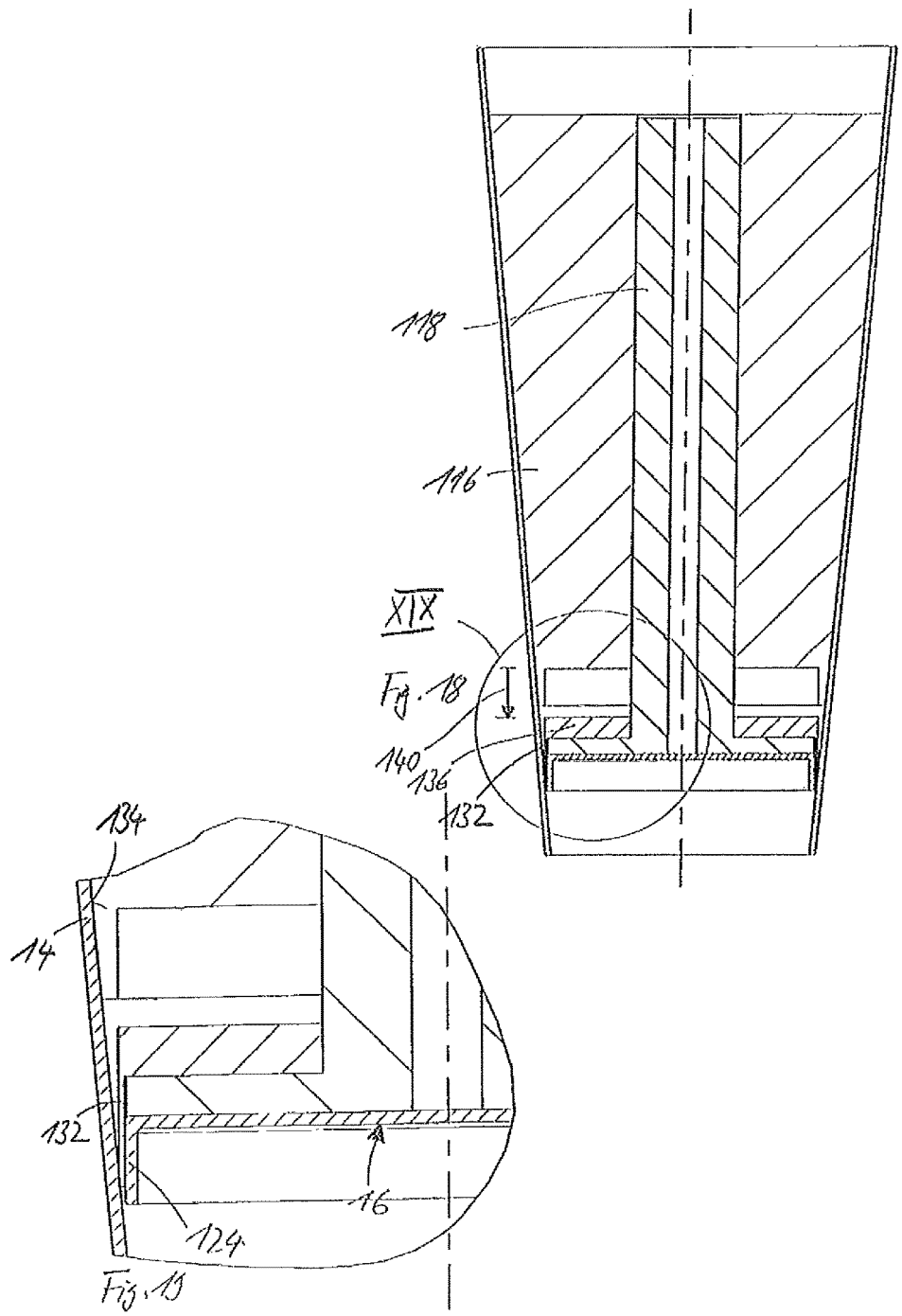

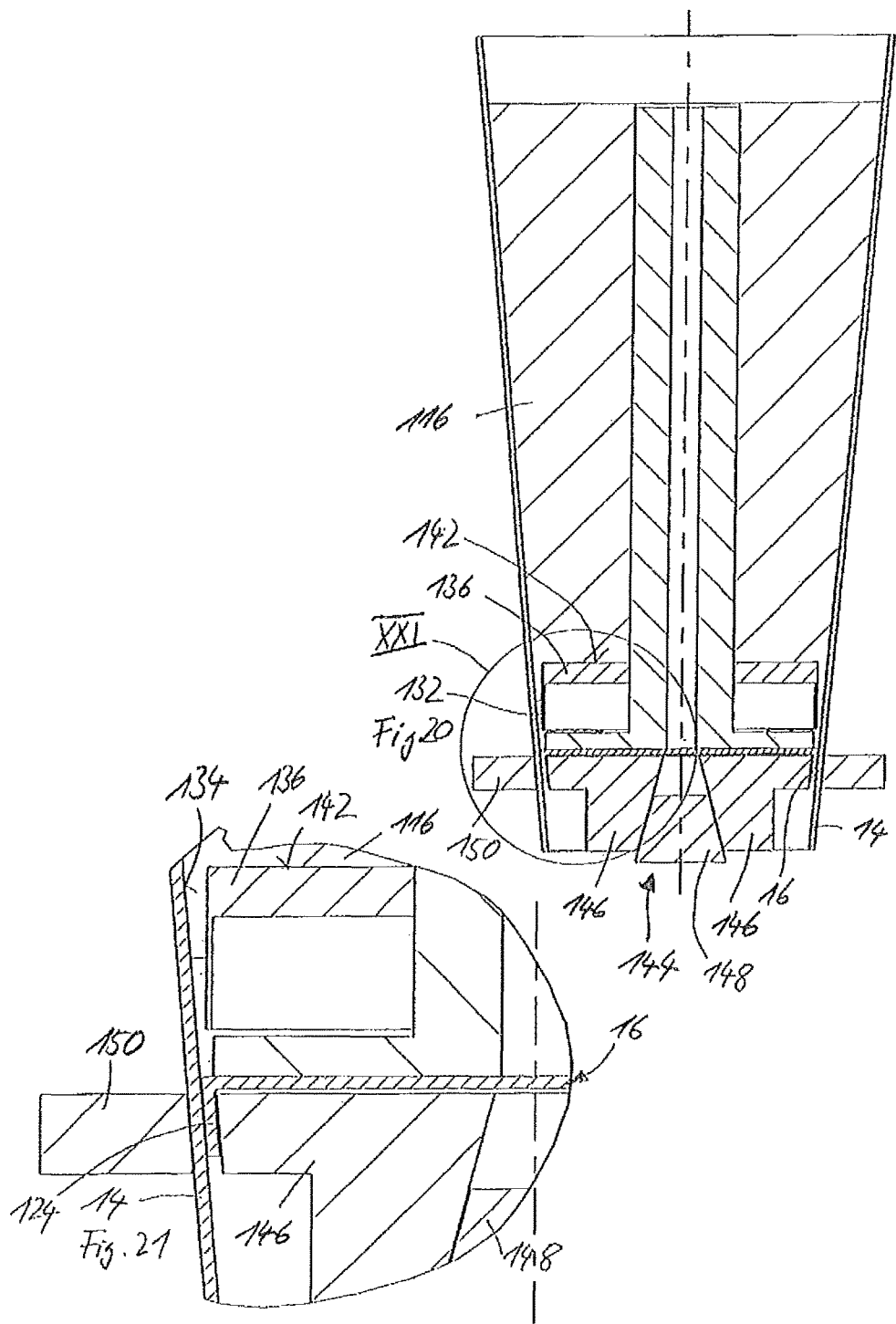

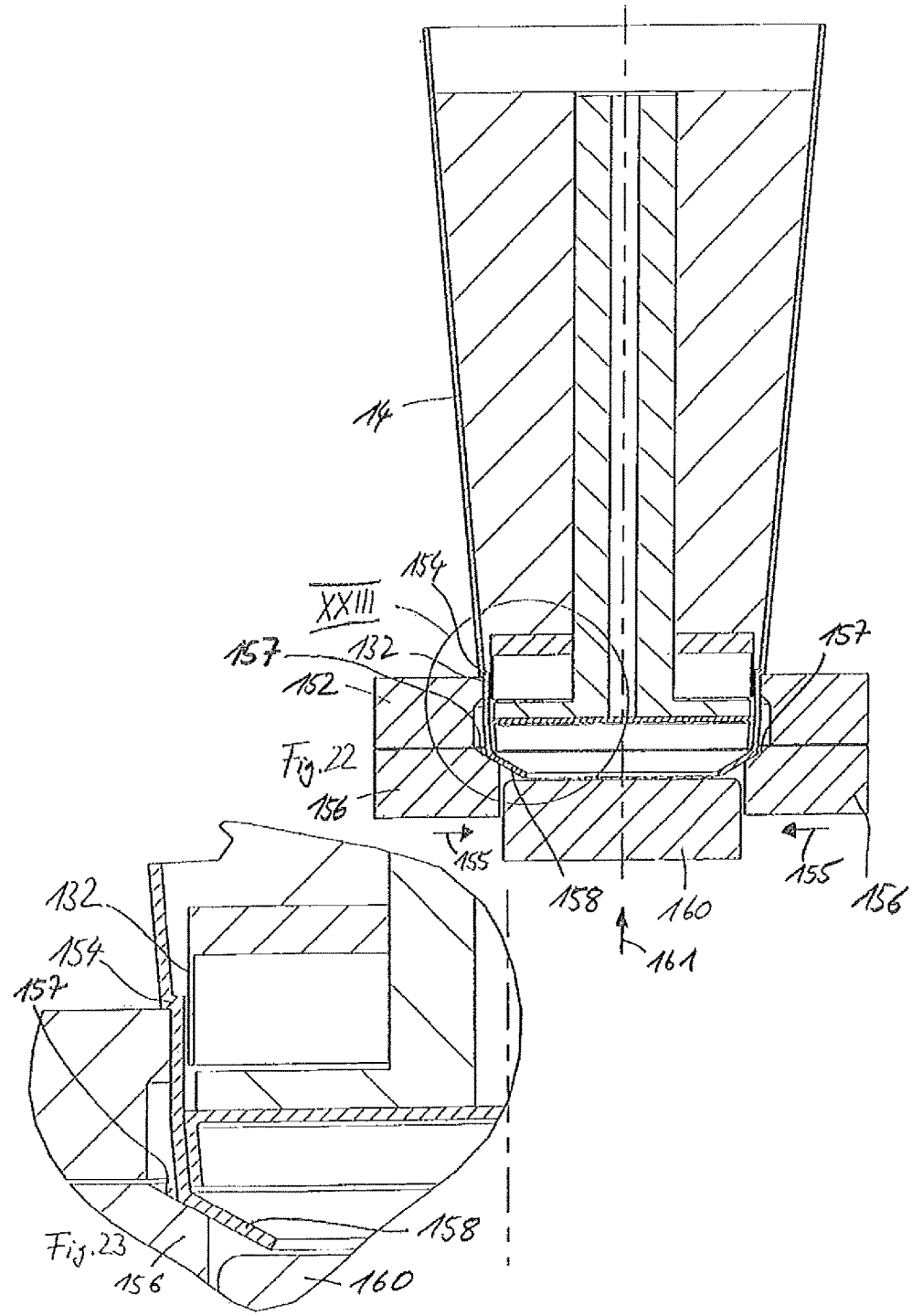

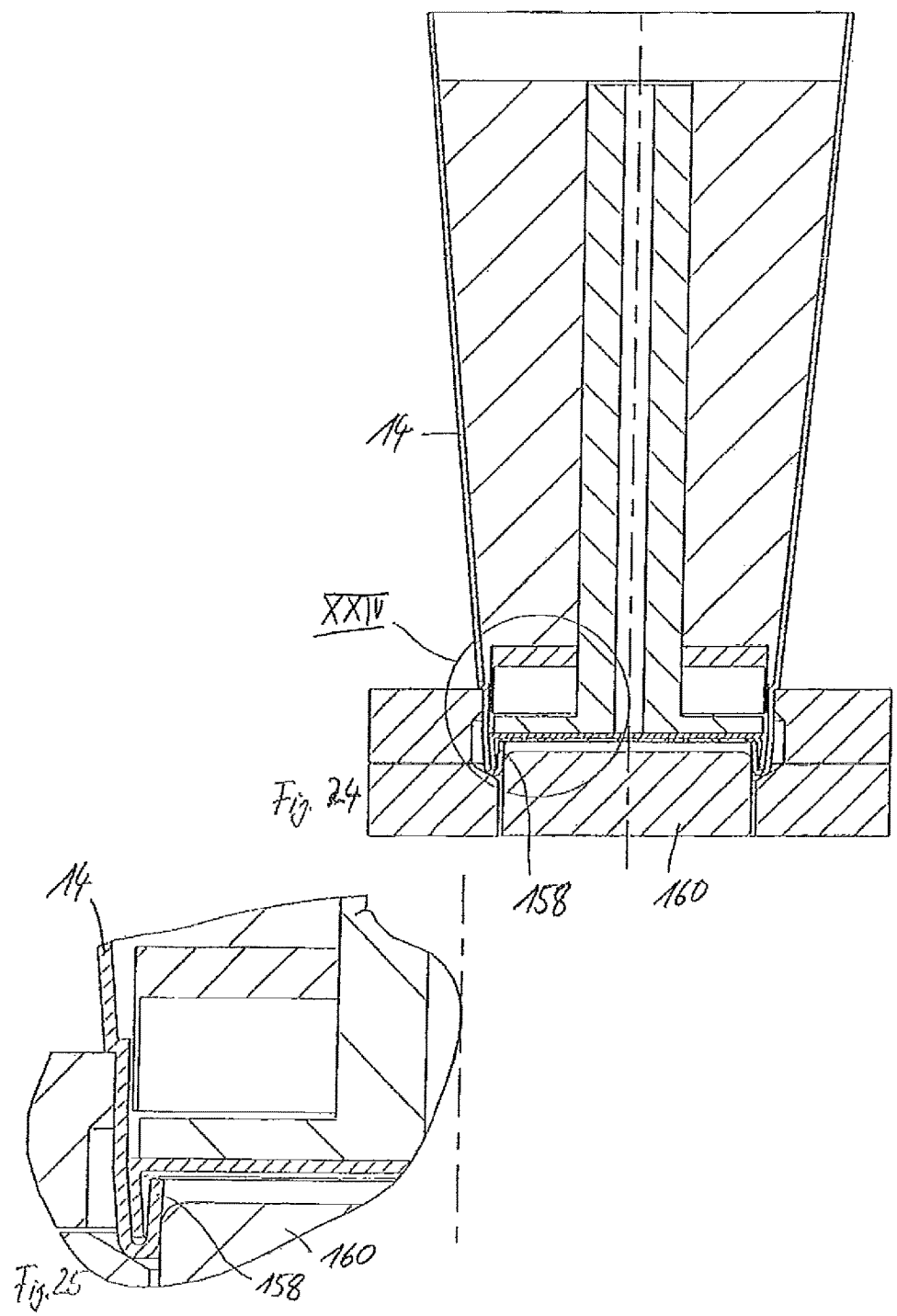

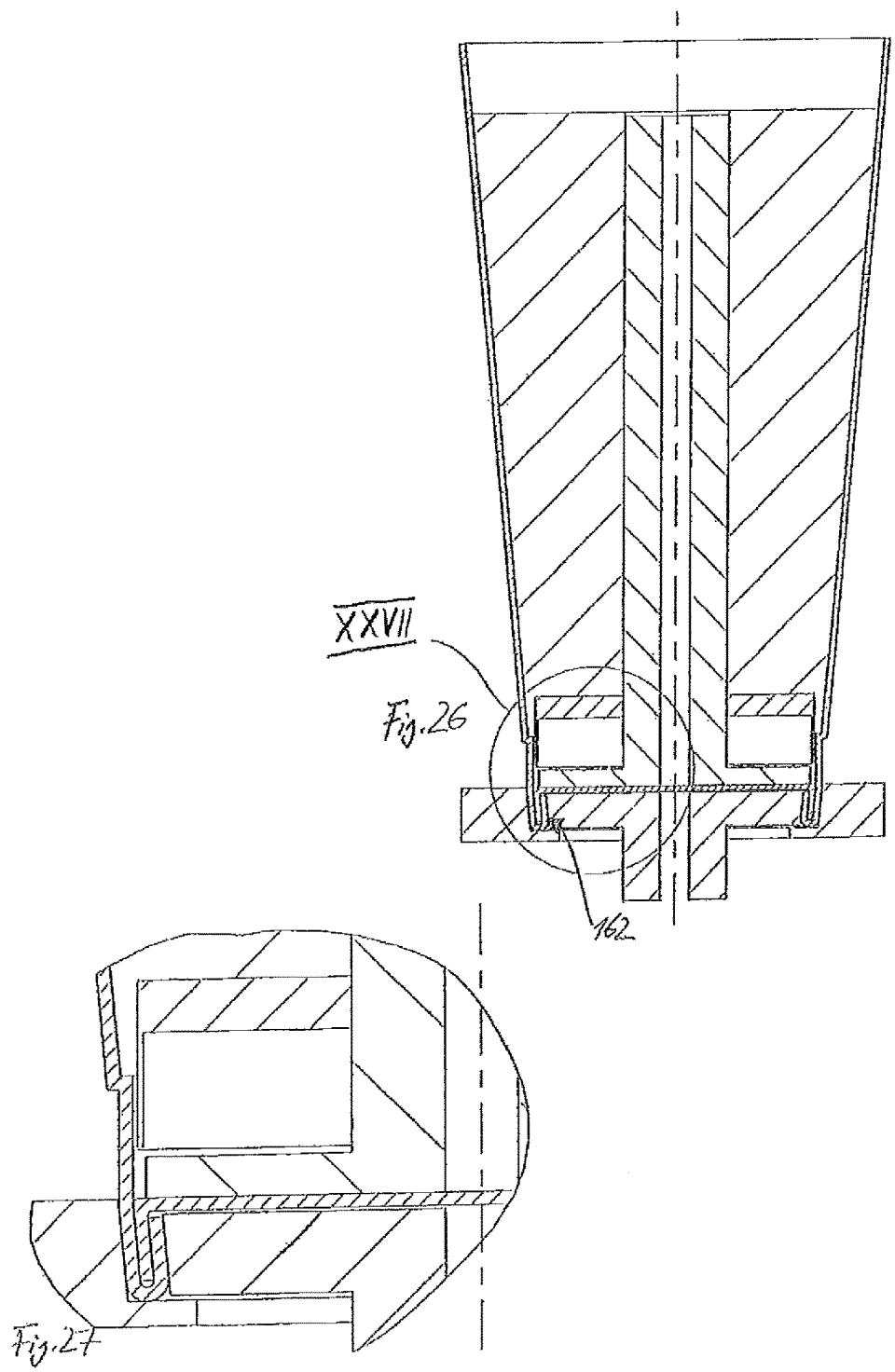

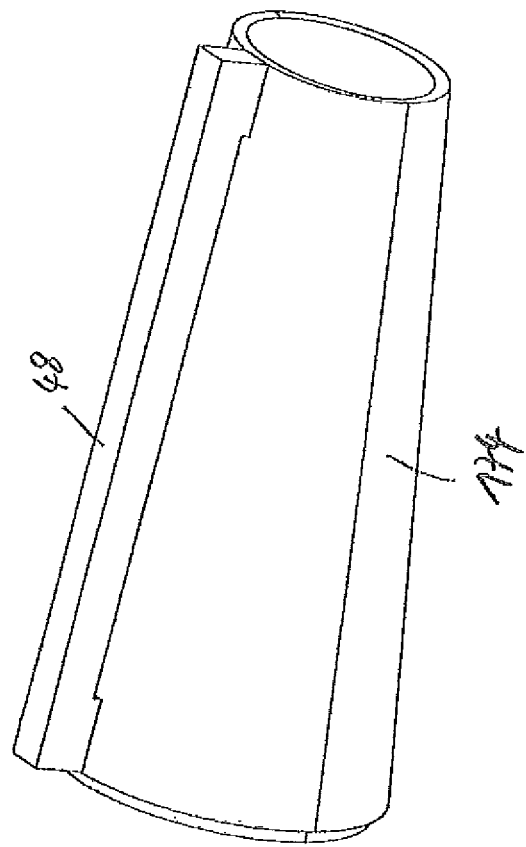
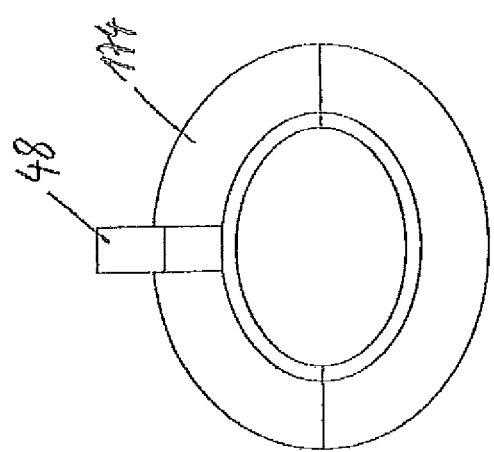

METHOD FOR PRODUCING A CUP

CROSS-REFERENCE TO RELATED APPLICATIONS

This application claims the priority of the German patent application DE 10 2014 210 960.4, filed on Jun. 6, 2014, the disclosure of which is hereby incorporated into this application.

FIELD, BACKGROUND AND SUMMARY OF THE INVENTION

The invention relates to a method for producing a cup from a flat segment and a pot-like base, and also to an apparatus for producing a cup of this kind.

The aim of the invention is to improve a method and an apparatus for producing a cup.

According to the invention, a method for producing a cup from a flat segment and a pot-like base involves winding the flat segment onto a winding mandrel, so that there is an overlap in the region of the side edges of the segment, connecting the sections, which adjoin the side edges, in the region of the overlap, so that a conical sleeve is produced, inserting the pot-like base into the conical sleeve, and connecting a circumferential wall of the pot-like base in a substantially liquid-tight manner to an inner face of the sleeve.

The method according to the invention is intended for paper material and materials which can be processed in a similar manner to paper. By way of example, flat segments can comprise paper, paperboard or cardboard, and these flat segments can then firstly be wound in order to form a conical sleeve and secondly can be deformed in order to form a pot-like base. The paper material is expediently coated in a liquid-tight manner. In the same way or at least in a similar way to paper material, flat plastic materials are also processed to form cups. Flat plastic materials include, for example, plastic laminates. In this case, the flat plastic material which is present in segment form is likewise wound around a winding mandrel and connected in the region of the overlap in order to form a conical sleeve. A pot-like base can also be formed from the flat plastic material by a circular blank being folded approximately vertically upward in relation to a base area in its border region. The problems which occur with plastic materials which can be processed in a similar manner to paper are substantially the same as occur when processing paper material. The present invention can be used for plastic materials which can be processed in a similar manner to paper, but it is not specially designed for plastic materials which can be processed in a similar manner to paper, but rather can also be used for paper materials with considerable advantages, especially when the paper material comprises, for example, a very stiff and/or thick paperboard.

In one development of the invention, a pressing force is exerted in the region of the overlap when the sections which adjoin the side edges are connected, wherein the pressing force is greater in those regions which directly adjoin the bottom edge of the sleeve and the top edge of the sleeve than in the other regions of the overlap.

Therefore, according to the invention, provision is made to compress the paper material or material which can be processed in a similar manner to paper to a greater extent in the region of the bottom edge and of the top edge of the sleeve than in the centre region. As a result, specifically in the case of comparatively thick materials, the subsequent shaping of the bottom edge and of the top edge of the sleeve to form a top curl or a bottom skirt is considerably simplified.

In one development of the invention, the length of the region which directly adjoins the bottom edge of the conical sleeve is selected to be of such a size that the region extends at least over the outer face and inner face of a bottom skirt on the finished cup, the base and the sleeve being connected in a substantially liquid-tight manner to the said bottom skirt.

In order to produce a bottom skirt, the sleeve is generally folded over inwards through 180° and the wall of the pot-like base is accommodated in this folded-over portion. In order to be connected in a liquid-tight manner, the sleeve and the base are then pressed and/or connected in a cohesive manner in the region of the bottom skirt. Production of the bottom skirt is considerably simplified when the region of the overlap at the bottom edge of the sleeve is pressed to a greater extent than in the centre region, and therefore the overlap in the region of the future bottom skirt is flatter than in the centre region.

In one development of the invention, the length of that region which directly adjoins the top edge of the conical sleeve is selected to be of such a size that the region extends at least over the top curl on the finished cup.

In the region of the top curl, the overlap which is pressed flat to a greater extent than the centre region considerably simplifies production of the top curl. It goes without saying that the entire region of the overlap per se could be pressed together to a great extent. However, the pressing forces required for this purpose are so high that they would require considerable reinforcement of the apparatus or machine used for producing cups from paper material and materials which can be processed in a similar manner to paper. Owing to the overlap being pressed to a relatively great extent only in the region of the top edge and bottom edge of the sleeve, it is consequently also possible to process very thick paper materials or plastic materials which can be processed in a similar manner to paper without problems and without requiring major changes to the machine itself.

In one development of the invention, the flat segment is wound onto a winding mandrel in order to produce the conical sleeve, the cross section of the said winding mandrel differing from a circular shape and being either oval, elliptical or flattened in the region of the overlap of the segment edges.

In the case of very stiff paper materials or plastic materials which can be processed in a similar manner to paper, the use of a winding mandrel with a circular cross section results in deformation of the sleeve into a cross-sectional shape which differs from the circular shape after the sleeve is removed from the winding mandrel. This is caused by the double material layer in the region of the overlap. Even when the region of the overlap is sealed by a temperature effect, the circular shape is not maintained after the said sleeve is slipped off from the winding mandrel. Surprisingly, a winding mandrel with a non-circular cross section can provide help in this case. By way of example, the winding mandrel can be of oval or elliptical design, wherein the region of the overlap is then arranged on a planar section of the winding mandrel or a section of the winding mandrel with a relatively large radius of curvature. As an alternative, the winding mandrel can differ from the circular shape only in the region of the overlap and be flattened in the region of the overlap. In this case, the sleeve assumes a form with a circular cross section after being slipped off from the winding mandrel, even in the case of very stiff paper material and very stiff plastic material which can be processed in a similar manner to paper.

In one development of the invention, a pressing die is used in order to exert the pressing force, the said pressing die being at a further distance from the winding mandrel in the centre region than in its two end regions.

The pressing force which is relatively high in the region of the bottom edge and the top edge of the sleeve can be implemented in a simple manner using a pressing die of this kind.

In one development of the invention, a lower border of the sleeve, which lower border projects beyond the lower edge of the circumferential wall of the base, is folded over by means of a plurality of jaws, which can be displaced in the radial direction, inwards until the lower border assumes a predefined first angular position in relation to the centre longitudinal axis of the sleeve.

Even very stiff paper material or very stiff flat plastic material can be folded over in a very precise and reliable manner at the lower border of the sleeve by the said measures. In contrast to conventional methods for cup production in which the lower border of the sleeve is folded over by positioning a die parallel to the centre longitudinal axis of the sleeve, the radially displaceable jaws which are provided according to the invention reliably prevent the lower border of the sleeve from buckling during the folding-over process. Folding over the lower border, which forms a substep of the production of the lower, circumferential bottom skirt for connecting the sleeve and the base, can therefore be performed with very short cycle times and with process reliability.

In one development of the invention, proceeding from the first angular position of the lower border, the sleeve is folded over to a second predefined angular position by means of a die which can be moved parallel to the centre longitudinal axis of the sleeve.

After the lower border is moved by the jaws, which can be displaced radially inwards, to the predefined first angular position in which the lower border assumes, for example, an angle of between 50° and 60° in relation to the centre longitudinal axis, there is no longer any risk of buckling during further folding over of the border, and the border can be further folded over, for example into a second angular position in which the border assumes an angle of approximately 180° in relation to the centre longitudinal axis, in a proven manner by means of a die which can be positioned parallel to the centre longitudinal axis.

In the case of the invention, a first channel-like recess is made in the flat segment or in the conical sleeve, wherein the first channel-like recess runs at a constant distance from a relatively short bottom edge of the segment or a bottom edge of the sleeve, and the sleeve is folded over around the first channel-like recess in order to form a bottom skirt with the circumferential wall of the pot-like base, so that a region around the first channel-like recess forms a standing area for the cup when the sleeve is in the fully folded-over state.

Pre-embossing the region in which the bottom skirt will be formed in future is highly advantageous specifically in the case of very thick, and as a result stiff, paper material. The material can be pre-embossed either on the flat segment or only on the finished sleeve in this case.

In the case of the invention, a plurality of second, channel-like recesses which are situated next to one another and which extend from the first channel-like recess as far as the bottom edge of the segment or the bottom edge of the sleeve are embossed.

In one development of the invention, the material of the sleeve in the region of the top edge of the sleeve is heated, and the top curl is then formed.

In this way, forming of the top curl can be simplified specifically in the case of very stiff paper material or plastic material which can be processed in a similar manner to paper. Surprisingly, heating of the material before forming the top curl is helpful even in the case of paper material. It goes without saying that care must be taken to ensure that the paper material does not catch fire in the process.

In one development of the invention, lubricant is applied in the region of the top edge of the sleeve, and the top curl is then formed.

The problem on which the invention is based is also solved by an apparatus for producing a cup using a winding mandrel which tapers on one side, in which winding mandrel a cross section of the winding mandrel differs from a circular shape and is either oval, elliptical or flattened in the region of the overlap of the segment edges.

Surprisingly, a circular sleeve can be produced by a winding mandrel of this kind which differs from a circular shape in the case of very stiff paper material or very stiff plastic material which can be processed in a similar manner to paper. Owing to the overlap during the production of the sleeve, the sleeve is considerably stiffer in the region of the overlap since the material thickness is doubled there. Owing to an oval winding mandrel or a winding mandrel which is flattened in the region of the overlap of the segment edges, the sleeve, when it is removed from the winding mandrel, deforms in such a way that it acquires a circular shape in cross section.

In one development of the invention, a winding mandrel and a pressing die are provided in the apparatus for producing a cup, wherein the pressing die extends along a surface line of the winding mandrel, and wherein the pressing die is at a further distance from the winding mandrel in its central region than in its two end regions in a state in which it is mounted onto the winding mandrel.

The region of the overlap at the bottom edge and top edge of the sleeve can be pressed to a greater extent in a simple manner by a pressing die of this kind, as a result of which the wall thickness of the sleeve is reduced at the overlap in the region of the top edge and bottom edge of the sleeve. This considerably simplifies the subsequent forming of a top curl at the top edge of the sleeve and, respectively, of a bottom skirt at the bottom edge of the sleeve.

BRIEF DESCRIPTION OF THE DRAWINGS

Further features and advantages of the invention can be gathered from the claims and the following description of preferred embodiments of the invention in conjunction with the drawings. Individual features of the different embodiments which are illustrated in the drawings can be combined in any desired manner in this case, without going beyond the scope of the invention. In the drawings:

FIG. 1 shows a schematic sectional view through an apparatus for producing a cup when executing a first method step, FIG. 2 shows the enlarged detail II from FIG. 1, FIG. 3 shows the apparatus for producing a cup when executing a second method step, FIG. 4 shows the enlarged detail IV from FIG. 3, FIG. 7 shows a view of a winding mandrel of the apparatus according to the invention obliquely from above, FIG. 8 shows the winding mandrel from FIG. 7 in a view from the front, FIG. 9 shows the winding mandrel from FIGS. 7 and 8 with the pressing die mounted and the sleeve pushed on, FIG. 10 shows a sleeve, which is produced using the winding mandrel from FIG. 7, after it is removed from the winding mandrel, FIG. 11 shows a front view of the sleeve from FIG. 10, FIG. 16 shows the apparatus for producing a cup when executing a further method step, FIG. 17 shows the enlarged illustration of the detail XVII from FIG. 16, FIG. 18 shows the apparatus for producing a cup when executing a further method step, FIG. 19 shows the enlarged detail XIX from FIG. 18, FIG. 20 shows the apparatus for producing a cup when executing a further method step, FIG. 21 shows an enlarged illustration of the detail XXI from FIG. 20, FIG. 22 shows the apparatus for producing a cup when executing a further method step, FIG. 23 shows the enlarged detail XXIII from FIG. 22, FIG. 24 shows the apparatus for producing a cup when executing a further method step, FIG. 25 shows the enlarged detail XXV from FIG. 24, FIG. 26 shows the apparatus for producing a cup when executing a further method step, FIG. 27 shows the enlarged detail XXVII from FIG. 26, FIG. 30 shows a front view of a winding mandrel of the apparatus according to the invention in accordance with a further embodiment, and FIG. 31 shows the winding mandrel from FIG. 30 obliquely from above.

DETAILED DESCRIPTION

Figure 5:
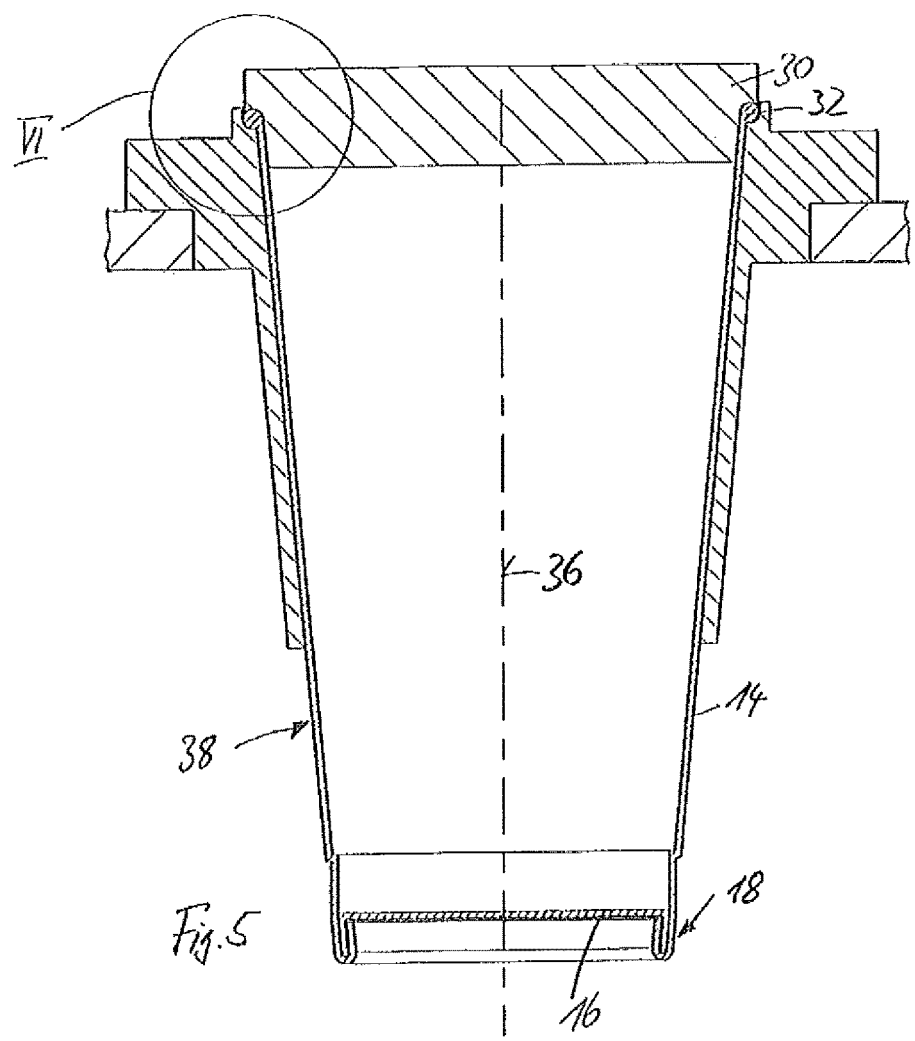
FIG. 5 shows the apparatus according to the invention for producing a cup when executing a third method step.

The illustration in FIG. 1 shows an apparatus 10 for producing a cup, wherein only a small detail of the apparatus is illustrated. The apparatus 10 has a conical receptacle 12, wherein, for example, a plurality of conical receptacles 12 can be arranged over the circumference of a star wheel. The conical receptacle 12 holds a likewise conical sleeve 14 which is already connected in a substantially liquid-tight manner to a pot-like base 16 in the region of a bottom skirt 18. A region which adjoins the bottom edge of the sleeve 12 is folded over through 180° and a wall of the pot-like base 16 is held in the folded-over portion in order to form the bottom skirt 18. The region of the bottom skirt 18 is then pressed again in order to establish a substantially liquid-tight connection between the base 16 and the sleeve 14. Furthermore, the sleeve 14 is further provided with a circumferential stacking shoulder 20. A further, identical cup can be stacked on the circumferential stacking shoulder 20 in order to prevent several cups which are stacked one in the other from becoming stuck.

The receptacle 12 has, at its upper border, an annular recess 22 which later serves to form a top curl at the top edge of the sleeve 14. In the method step illustrated in FIG. 1, a die 24 is inserted into the large opening, which is situated at the top in FIG. 1, in the sleeve 14 in order to prepare that region which surrounds the upper opening of the sleeve 14 for the forming of the top curl. The die 24 ensures that the top edge of the sleeve 14 runs in a substantially circular manner and can be shaped in order to form a top curl in a subsequent method step. The die 24 is composed of a porous material, for example felt, and also serves to coat the inner face of the upper border of the sleeve 14 with lubricant.

FIG. 2 shows an enlarged illustration of the detail II from FIG. 1.

The illustration in FIG. 3 shows a method step which follows the method step illustrated in FIG. 1. In this method step, air which is heated by means of a hood 26 which is provided with ducts 28 is blown towards the region which adjoins the top edge of the sleeve 14. In this case, the hood 26 surrounds the top edge of the sleeve 14 and ensures that the heated air cannot escape at the top. In this case, the heated air is, see FIG. 4, blown through the ducts 28 towards the sleeve 14 from the outside. In addition, a lubricant can be applied to the region of the top edge of the sleeve 14 either before or after the said region is heated, in order to simplify the subsequent forming of the top curl.

Figure 6:
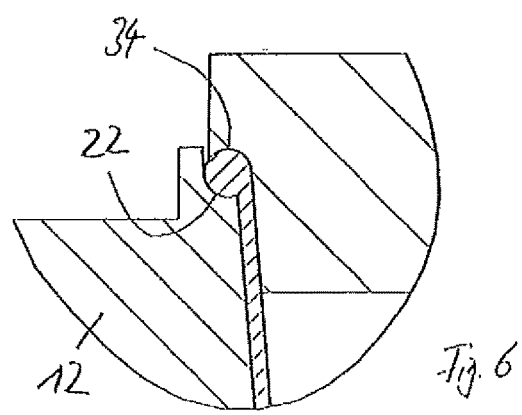
FIG. 6 shows the detail VI from FIG. 5.

The illustration in FIG. 5 shows the apparatus according to the invention for producing a cup after a die 30 has been mounted onto the sleeve 14 in order to form a top curl 32. Mounting the die 30 causes the top edge of the sleeve 14 to be turned outwards and curl through approximately 270° to 360°. To this end, the die 30 has, see FIG. 6, a circular groove 34 which is open at the bottom. Together with the groove 22 in the receptacle 12, the groove 34 consequently forms a recess which is approximately circular in cross section and which leads to curling of the top edge of the sleeve 14 and consequently to the formation of the top curl 32 when the die 30 is positioned in the direction of the base 16. In order to form the top curl 32, the die 30 can be only axially positioned or else additionally rotate about the centre longitudinal axis 36 of the sleeve 14.

After completion of the method step illustrated in FIG. 5, a complete cup 38 is created from the sleeve 14 and the base 16. Depending on requirements, the cup 38 can now be further provided with an outer casing and/or an insulating layer in order to be suitable for hot beverages too.

The described steps for producing the top curl allow a top curl to be produced even in the case of very stiff and/or thick paper material and also in the case of very stiff and/or thick plastic material which can be processed in a similar manner to paper.

The illustration in FIG. 7 shows a winding mandrel 40 in a schematic illustration obliquely from above. The winding mandrel 40 has one end 42 with a relatively large diameter and one end 44 with a relatively small diameter. The winding mandrel 40 is provided with a flat material segment in order to produce a conical sleeve. In this case, the flat material segment is placed around the winding mandrel 40 and the longitudinal edges of the flat segment are placed one over the other in a region 46 of the winding mandrel 40. A conical sleeve is produced after the region of the overlap has then been connected. As shown in FIG. 7, a cross-sectional shape of the winding mandrel 40 differs from the circular shape. In particular, the region 46 on which the overlap of the segment edges of the flat segment is arranged is of flattened design. This can also be clearly seen in the illustration in FIG. 8, a front view of the winding mandrel 40. The winding mandrel 40 has, in the region 46 of the future overlap of the segment edges, a flattened portion in order to allow production of a conical sleeve with a circular cross section in the case of very stiff paper material or very stiff plastic material which can be processed in a similar manner to paper too, as is illustrated in FIGS. 10 and 11. Since the region of the overlap has twice the material thickness, this region of the sleeve 14 behaves differently to the other region which has only the single material thickness after the said sleeve is removed from the winding mandrel 40. It has been established that a flattened portion in the region 46 of the winding mandrel 40 can produce a conical shape with a circular cross section of the sleeve 14 after the sleeve 14 is removed from the winding mandrel 40.

As an alternative to the shape of the winding mandrel illustrated in FIGS. 7 and 8, the winding mandrel can also be designed with an oval or elliptical cross-sectional shape, wherein the overlap of the segment edges is then arranged in a planar region of the oval or a region of the ellipse with a relatively large diameter.

The illustration in FIG. 9 shows a schematic illustration of the winding mandrel 40 with the applied sleeve 14 and a pressing die 48. The pressing die 48 is arranged opposite the region 46 of the winding mandrel 40 in which the overlap of the segment edges is produced.

Figure 12:
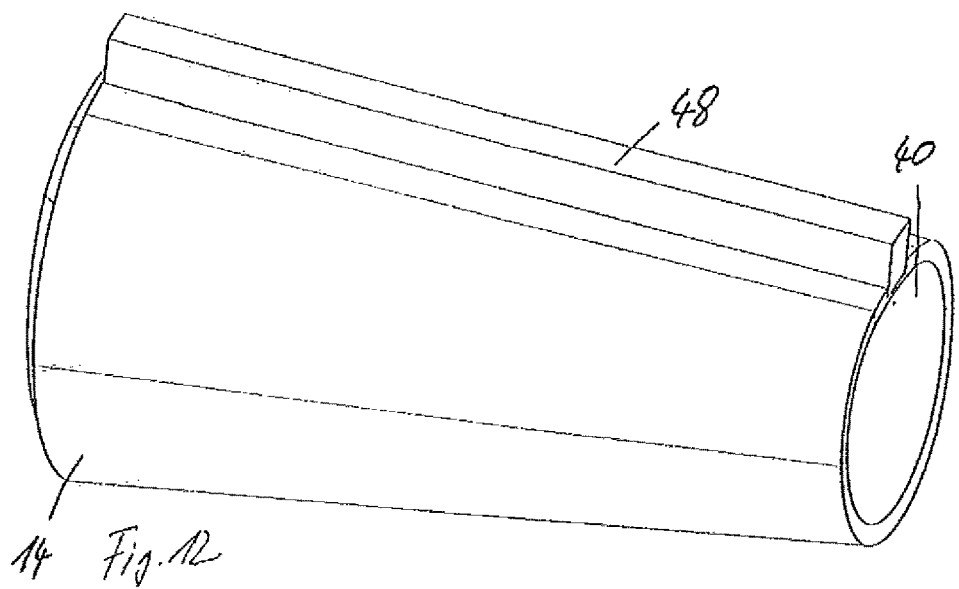
FIG. 12 shows a schematic illustration of the winding mandrel from FIG. 9 obliquely from above.

The illustration in FIG. 12 shows a view of the winding mandrel 40 with the applied sleeve 14 and the pressing die 48 obliquely from above.

Figure 13:
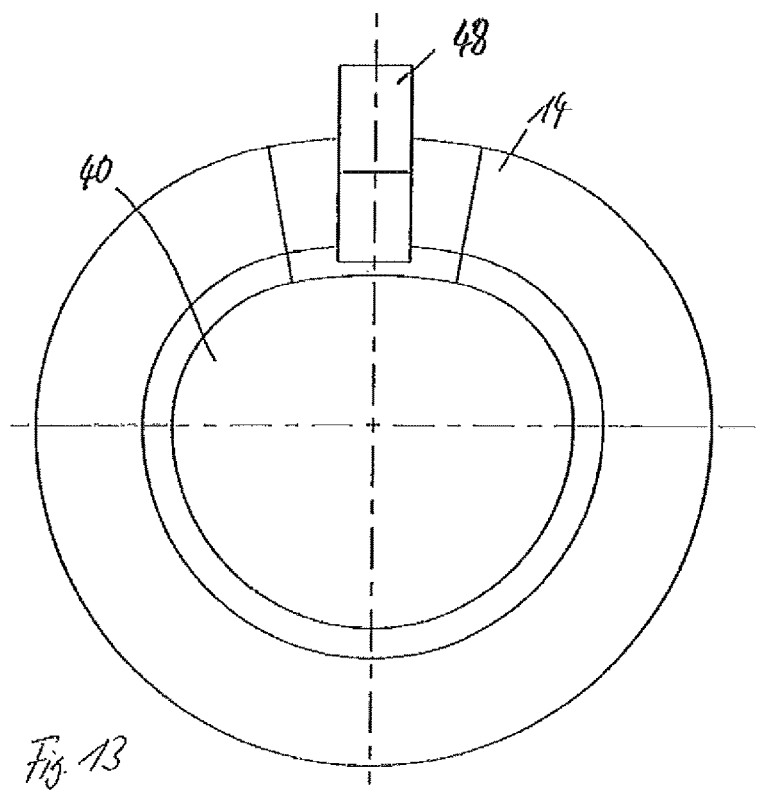
FIG. 13 shows the winding mandrel from FIG. 12 in a front view.

FIG. 13 shows the winding mandrel 40 with the pressing die 48 and the sleeve 14 from the front.

Figure 14:
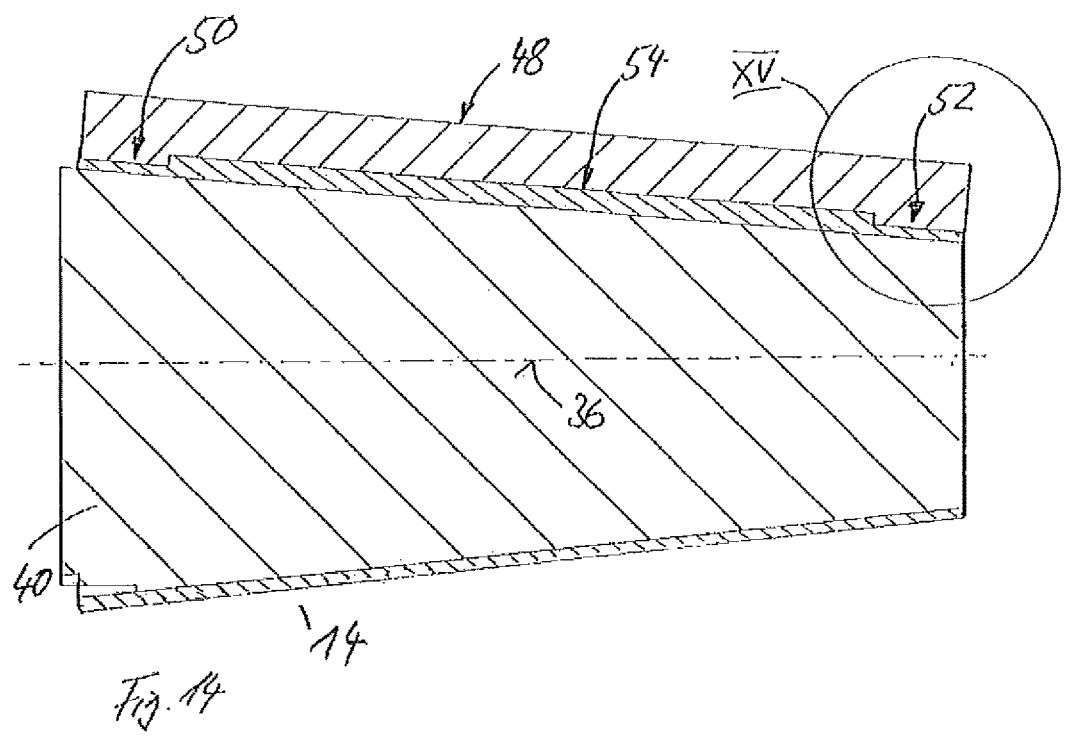
FIG. 14 shows the winding mandrel from FIG. 12 in a longitudinal section.
Figure 15:
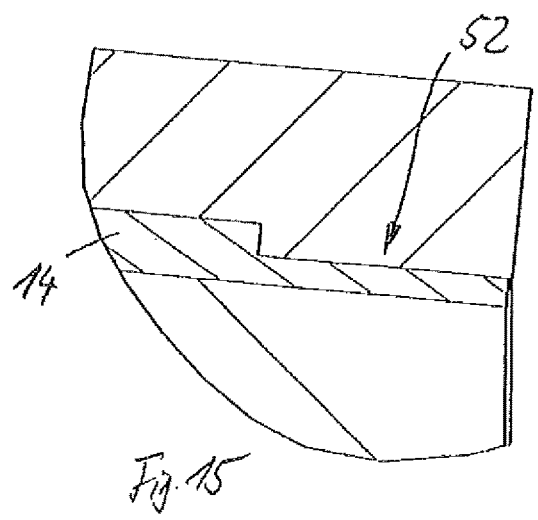
FIG. 15 shows the enlarged detail XV from FIG. 14.

FIG. 14 shows a view of a sectional plane through the centre longitudinal axis 36 of the winding mandrel 40 and the sleeve 14 from FIG. 12. FIG. 14 shows that the pressing die 48, which extends along a surface line of the winding mandrel 40, is at a shorter distance from the surface of the winding mandrel 40 in a region 50, which compresses a region of the sleeve 14 which adjoins the top edge of the sleeve 14, and in a region 52, which compresses a region of the overlap which adjoins the bottom edge of the sleeve 14, than in its centre region 54. The centre region 54 is therefore recessed with respect to the regions 50, 52. Therefore, when the pressing die 48 is mounted onto the sleeve 14, a considerably greater pressing force is exerted onto the sleeve 14 in the regions 50, 52 than in the centre region 54. As a result, the material of the sleeve 14 between the regions 50, 52 of the pressing die and the winding mandrel 40 is pressed together to a significantly greater extent than the region which is situated between the centre region 54 and the pressing die 48. In this case, the regions 50, 52 deform a region of the overlap in which the bottom skirt 18 and the top curl 32 will be formed on the finished cup, see FIG. 5, in future. As shown in FIG. 14 and also in the enlarged illustration in FIG. 15, the sleeve 14 is compressed to approximately half the material thickness present in the centre region 54 in the regions 50, 52 in this case. Since FIG. 14 shows a longitudinal section through the region of the overlap of the segment edges of the sleeve 14, the region of the overlap then consequently acquires, owing to the pressing die 48, at the top edge and bottom edge of the sleeve 14, a material thickness which differs only slightly from the material thickness over the rest of the circumference of the sleeve 14 and as a result can be shaped to form a top curl 32 and a bottom skirt 18 in a dependable and process-reliable manner. The schematic illustration in FIG. 14 does not show these relationships in respect of thickness and serves merely to explain the functional principle.

Since only the two regions 50, 52 are compressed to a relatively great extent, the required pressing force does not increase to an excessive extent. In this case, the regions 50, have a length which in each case corresponds merely to approximately 10% of the total length of the pressing die 48. As a result, the force which has to be exerted onto the pressing die 48 is greater than in the case of conventional pressing dies, but nevertheless the apparatus for producing the cup does not have to be designed for excessively large pressing forces which would be required if the regions 50, 52 were to extend over the entire length of the pressing die or over a larger region than is illustrated in FIG. 14.

The illustrations in FIGS. 16 to 27 describe the processes of inserting the pot-like base 16 into the conical sleeve 14 and also folding over the lower border of the sleeve 14 and subsequently forming the bottom skirt 18.

FIG. 16 shows a schematic sectional view through an apparatus 110 for producing a cup from a conical sleeve 14 and a pot-like base 16. The apparatus 110 can be part of a relatively large machine, not illustrated, and, for example, several of the apparatuses 110 can be arranged on a star wheel.

The sleeve 14 has been produced from a flat segment by winding and adhesive bonding or sealing in the region of an overlap, not illustrated. The pot-like base 16 has likewise been produced from a flat segment. The sleeve 14 is arranged on a likewise conical mandrel 116 which has a central guide bore in which a die 118 for holding the base 16 is guided. The die 118 has an operating rod 120 and a die plate 121 with a die face 122. The die face 122 bears against a base face 130 of the base 16, which base face is situated at the top in FIG. 1. In a finished cup, this base face 130 of the base 16, which base face is situated at the top, defines a lower boundary of the interior space in the cup which can be filled with liquid. A circumferential wall 24 which extends at a right angle from the base face starts from the base face 130 of the base 16. As a result, the base 16 acquires a pot-like shape.

The operating rod 118 is provided with a continuous bore 126. A negative pressure is temporarily applied to the bore 126 during the production process. The passage bore 126 issues into the die face 122, so that the base face 130 of the base 16 is pulled towards the die face 122 after a negative pressure is applied to the bore 126. As a result, the base 16 can be inserted into the sleeve 14 securely and without the risk of it falling away from the die face 122.

In the illustration in FIG. 1, the base 16 is inserted into the sleeve 14 from the top, that is to say in the direction of the relatively small opening in the sleeve 14.

A blow part 128 is arranged beneath the base 16, the said blow part being provided for the purpose of blowing warm air towards the inner face of the sleeve in order to simplify deformation of the sleeve and especially the folding over of the lower end of the sleeve 14 around the circumferential wall 124 of the base 16. Warm air 129 flows radially out of the blow part 128 in order to heat the inner face of the sleeve 14 in a region in which the circumferential wall 124 of the base 16 subsequently comes to lie. By way of example, a sealable coating of the inner face of the sleeve 14 can be heated in order to allow sealing of the circumferential wall 124 and therefore a liquid-tight connection between the circumferential wall 124 and the sleeve 14.

The enlarged detail XVII in FIG. 17 first shows the die face 122 against which the base face 130 of the base 16 is drawn. An outer face of the circumferential wall 124 of the base 16 is covered in sections by an annular covering sleeve 132. The covering sleeve 132 bears against a radially outer circumferential face of the circumferential wall 124 of the base 16. As will be explained further below, the covering sleeve 132 prevents the radially outer face of the circumferential wall 124 from coming into contact with an inner face 134 of the sleeve 14 before a predefined relative position of the base 16 and the sleeve 14 is reached.

The annular covering sleeve 132 is provided with a ring-like fastening plate 136, the central bore in the said fastening plate being matched to the outside diameter of the operating rod 118. The fastening plate 136 and the annular covering sleeve 132 which is integrally connected to the fastening plate 136 can therefore be displaced relative to the die 118. In the state shown in FIG. 16 and in FIG. 17, a bottom face of the fastening plate 136 rests on a top face of the die plate 121. The fastening plate 136 bears against a face of the mandrel 116 by way of its top face.

Proceeding from the state shown in FIG. 16 and FIG. 17, the die 118 is moved downwards together with the base 16 and the covering sleeve 132.

This state is then illustrated in FIG. 18. In the state shown in FIG. 18, the base 16 and the sleeve 14 have reached a relative position in relation to one another, the said base and sleeve also assuming the said relative position in relation to one another in the finished cup. In other words, the base 16 no longer has to be moved relative to the sleeve 14, at least not in the longitudinal direction of the sleeve 14, in order to finish the cup.

FIG. 18 shows that, proceeding from the state shown in FIG. 16 and FIG. 17, the die 118 has been moved downward by a distance which is indicated by the arrow 140 in FIG. 18. This is because the top face of the fastening plate 136, which top face is integrally connected to the annular covering sleeve 132, is now arranged at a distance from the mandrel 116. To this end, the operating rod 118 was displaced within the guide bore in the mandrel 116, as also shown, for example, by way of the upper end of the operating rod 118, see FIG. 16 and FIG. 18.

The enlarged detail XIX from FIG. 18 is illustrated in FIG. 19 and shows that the annular covering sleeve 132 now firstly bears against the inner face of the sleeve 14 and secondly against the radially outer circumferential face of the circumferential wall 124 of the base 16. In this case, the inside diameter of the covering sleeve 132 can be dimensioned such that the base 16 is easily compressed, that is to say slightly springs back after the covering sleeve 132 is withdrawn, so that the circumferential wall 124 then bears substantially flat against the inner face of the sleeve 14. The circumferential wall 124 of the base 16 does not bear against the inner face of the sleeve 14 in the state shown in FIG. 19, even though the base 16 and the sleeve 14 are arranged in relation to one another in a relative position which they also assume in relation to one another in the finished cup.

Proceeding from the state shown in FIG. 18 and FIG. 19, the covering sleeve 132, together with the fastening plate 136, is then withdrawn upward between the inner face 134 of the sleeve 14 and the circumferential wall 124 of the base 16. This withdrawn state is illustrated in FIG. 20. The said figure shows that the fastening plate 136 now again bears against the stop face 142 on the mandrel 116. The covering sleeve 132 has now been fully withdrawn between the base 16 and the sleeve 14, and the circumferential wall 124 bears against the inner face 134 of the sleeve 14. A multipartite die 144 has now been inserted into the sleeve 14 from below. This die 144 has a plurality of pressing jaws 146 which can move in the radial direction and which can be pressed radially outward by a centrally arranged operating element 148. On the outer face of the sleeve 14, a holding ring 150 bears against the outer face of the sleeve 14 in the region of the circumferential wall 124 of the base 16. This holding ring 50 provides an abutment when the pressing jaws 146 are moved radially outward, in order to press the circumferential wall 124 against the inner face 134 of the sleeve 14.

It is essential that relative displacement between the base 16 and the sleeve 14 is no longer necessary in order to press the circumferential wall 124 and the inner face of the sleeve 14, this being performed proceeding from the state shown in FIG. 20. There is therefore no risk of frictional forces between a surface of the base 16 and a surface of the sleeve 14 having to be overcome in order to position the base 16 in the sleeve 14.

The illustration shown in FIG. 21 shows an enlarged illustration of the detail XXI from FIG. 20. As has already been explained, the circumferential wall 24 of the base 16 now bears flat against the inner face 134 of the sleeve 14 since the annular covering sleeve 132 has been withdrawn upward between the circumferential wall 124 and the inner face of the sleeve 14. The pressing jaws 146 and the holding ring 150 now ensure pressing of the circumferential wall 124 with the inner face 134 of the sleeve 14 and, as a result, a liquid-tight connection of the base 16 with the sleeve 14.

The illustration shown in FIG. 22 shows a further method step which follows the state shown in FIG. 20 and FIG. 21. The pressing jaws 146 and the holding ring 150 have been removed. A circumferential stacking shoulder 154 is now formed into the sleeve 14 by means of a pressing ring 152 which has been pushed onto the sleeve 14 from below in FIG. 22. This stacking shoulder 154 serves to be able to reliably stack several cups one into the other. A certain degree of resistance when pushing on the pressing ring 152 is provided by the annular covering sleeve 132 which is arranged radially within the pressing ring 152 in the state shown in FIG. 22. Several jaws 156 which can be displaced radially inwards in accordance with the arrows 155 ensure that the lower border 158 of the sleeve is folded over radially inwards. The jaws 156 are illustrated in their radially inner end position in FIG. 22 and FIG. 23. A radially inner edge of the jaw 156, which radially inner edge folds over the lower border 158 of the sleeve 14, is provided with a bevel 157 which, in the event of a movement of the jaws 156 in accordance with arrows 155, runs on the lower border 158 of the sleeve 14 and folds over the border 158 inwards through approximately 50° to 60°. Since all jaws 156 have a bevel 157, the border 158 is folded over inwards over its entire circumference. A die 160 further folds over the border 158 through then approximately 180°, the said die being displaced upwards in accordance with the arrow 161 proceeding from the state shown in FIG. 22. Folding over of the lower border 158 of the sleeve 14 is simplified since, see FIG. 17, the sleeve 14 has been preheated in this fold-over region.

The illustration in FIG. 23 shows an enlarged illustration of the detail XXIII from FIG. 22.

Proceeding from the state shown in FIG. 22, the bottom border 158 of the sleeve 14 is, as has already been explained, folded over through approximately 180° by means of the die 160, see FIG. 24.

FIG. 25 shows an enlarged illustration of the detail XXIV from FIG. 24.

As shown in FIG. 26, the lower border 158 of the sleeve 14 is, proceeding from the state shown in FIG. 24, then pressed radially outwards in order to form a so-called circumferential bottom skirt 162 at the lower end of the sleeve 14, see FIG. 26. The bottom skirt 162 then forms a standing surface for a finished cup.

The illustration in FIG. 27 shows the enlarged detail XXVII from FIG. 26.

As shown primarily by way of FIGS. 18 to 21, the annular covering sleeve 132 allows the base 16 and the sleeve to be positioned relative to one another such that they have already reached the relative position which is intended for the completed cup, without the base 16 and the inner face of the sleeve 14 making contact. In particular, see FIG. 19, the radially outer face of the circumferential wall 124 of the base 16 and the inner face 134 of the sleeve 14 do not make contact until the predefined relative position is reached. A possibly high coefficient of friction between the material or the surface of the base 16 and the inner face of the sleeve 14 therefore does not adversely affect the production process for the cup. After the annular covering sleeve 132 has been withdrawn between the inner face of the sleeve 14 and the base 16, the circumferential wall 124 of the base 16 can bear flat against the inner face of the sleeve 14 by way of its radially outer face. Since the inner face of the sleeve 14 has been preheated in this region, the base 16 and the sleeve 14 can be immediately connected in a liquid-tight manner. This is assisted by the pressing jaws 146 which move radially outwards.

Figure 28:
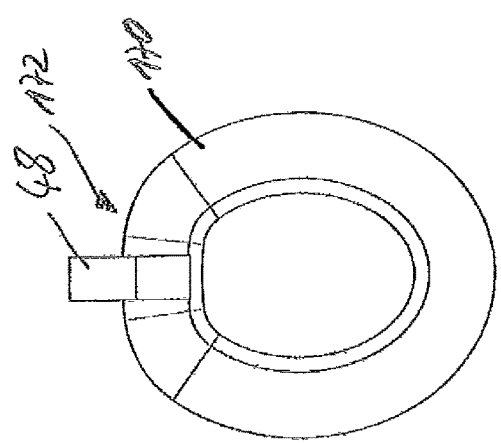
FIG. 28 shows a front view of a winding mandrel of the apparatus according to the invention in accordance with a further embodiment.

The illustration in FIG. 28 shows a front view of a winding mandrel 170. The pressing die 48 is arranged on the winding mandrel. The winding mandrel has a conical, generally elliptical, basic shape with a flattened portion 172. The flattened portion is arranged at a point on the generally elliptical cross section at which a relatively small radius of curvature of the ellipse would be arranged per se. The overlap of the segment edges is arranged in the region of the flattened portion 172. The special shaping of the winding mandrel 170 allows a sleeve with a circular cross section to be produced even in the case of very stiff flat paper materials or flat plastic materials after the finished conical sleeve is removed.

Figure 29:
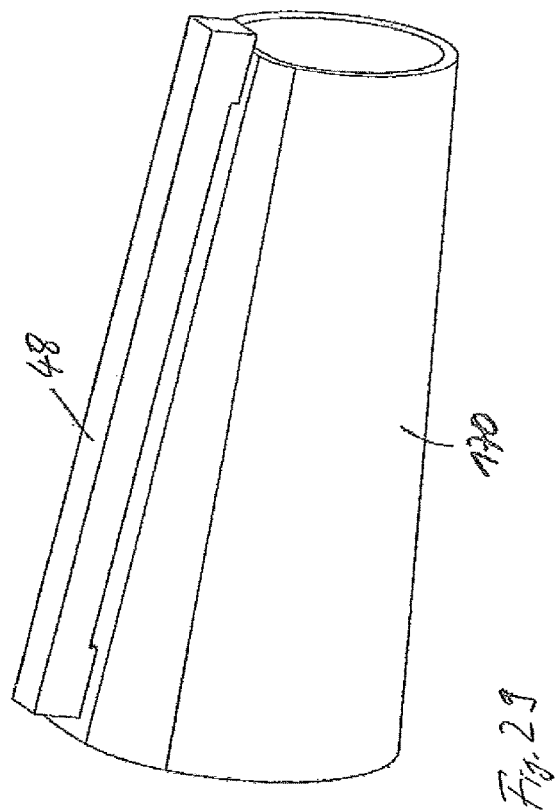
FIG. 29 shows the winding mandrel from FIG. 28 obliquely from above.

FIG. 29 shows the winding mandrel 170 in a view obliquely from above together with the pressing die 48.

The illustration in FIG. 30 shows a front view of a winding mandrel 174 according to a further embodiment of the invention. The winding mandrel 174 has an elliptical cross-sectional shape and is of conical design. The pressing die 48 is shown on the winding mandrel. The pressing die 48 is arranged in the centre of a region of the elliptical cross section which exhibits the relatively large radius of curvature of the ellipse. This can also result in the sleeve assuming a circular shape when winding a sleeve from stiff paper material or stiff plastic material after the finished sleeve is removed.

The cross-sectional shape of the winding mandrel 174 can also be of oval design. The cross-sectional shape would then be characterized in that it has a planar section approximately in that region in which the pressing die 48 is arranged, and also opposite the said region. A winding mandrel of this kind with an oval cross section can also result in a sleeve which has the shape of a circular truncated cone being produced after the said sleeve is removed.

The illustration in FIG. 31 shows the winding mandrel 174 with the pressing die 48 obliquely from above.

The invention claimed is:

1. A method for producing a cup from a flat segment and a pot-like base, comprising the steps of:
    winding the flat segment onto a winding mandrel so that there is an overlap in a region of side edges of the flat segment,
    connecting sections which adjoin the side edges in the region of the overlap so that a conical sleeve is produced,
    inserting the pot-like base into the conical sleeve, and
    connecting a circumferential wall of the pot-like base in a substantially liquid-tight manner to an inner face of the conical sleeve;
    wherein the flat segment is wound onto the winding mandrel in order to produce the conical sleeve, a cross section of the winding mandrel differing from a circular shape and being either oval or flattened in the region of the overlap of the side edges; and
    wherein an outer surface of the winding mandrel forms a continuous and smooth winding surface without a step over an entire periphery of the winding surface.

2. The method according to claim 1, wherein a pressing force is exerted in the region of the overlap when the sections which adjoin the side edges are connected, and wherein the pressing force is greater in those regions which directly adjoin a bottom edge of the sleeve and a top edge of the sleeve than in other regions of the overlap.

3. The method according to claim 2, wherein a length of a region which directly adjoins the bottom edge of the conical sleeve is selected to be of such a size that the region which directly adjoins the bottom edge of the conical sleeve extends at least over an outer face and an inner face of a bottom skirt on a finished cup, the pot-like base and the conical sleeve being connected in a substantially liquid-tight manner to the bottom skirt.

4. The method according to claim 2, wherein a length of the region which directly adjoins the top edge of the conical sleeve is selected to be of such a size that the region which directly adjoins the top edge of the conical sleeve extends at least over a top curl on a finished cup.

5. The method according to claim 2, wherein a pressing die is used in order to exert the pressing force, the pressing die being at a further distance from the winding mandrel in a centre region thereof than in two end regions thereof in a state in which the pressing die is mounted onto the winding mandrel.

6. The method according to claim 1, further comprising the steps of:
    folding over a lower border of the sleeve, which lower border projects beyond a lower edge of the circumferential wall of the pot-like base, by a plurality of jaws, which can be displaced in a radial direction, inwards until the lower border assumes a predefined first angular position in relation to a centre longitudinal axis of the sleeve.

7. The method according to claim 6, wherein, proceeding from the first angular position of the lower border, the sleeve is folded over to a second predefined angular position by a die which can be moved parallel to the centre longitudinal axis of the sleeve.

8. The method according to claim 1, wherein material of the sleeve in the region of a top edge of the sleeve is heated, and a top curl is then formed.

9. The method according to claim 8, wherein lubricant is applied in the region of the top edge of the sleeve, and the top curl is then formed.

10. An apparatus for producing a cup according to the method of claim 1, wherein the winding mandrel tapers on one side.

11. An apparatus for producing a cup according to the method of claim 1, using a pressing die, wherein the pressing die extends along a surface line of the winding mandrel, wherein the pressing die is at a further distance from the winding mandrel in a centre region thereof than in two end regions thereof in a state in which the pressing die is mounted onto the winding mandrel.

* * * * *